United States Patent
Kim

(10) Patent No.: US 10,987,998 B2
(45) Date of Patent: Apr. 27, 2021

(54) THERMAL MANAGEMENT SYSTEM FOR VEHICLE

(71) Applicants: Hyundai Motor Company, Seoul (KR); Kia Motors Corporation, Seoul (KR)

(72) Inventor: Jae Yeon Kim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 64 days.

(21) Appl. No.: 16/662,983

(22) Filed: Oct. 24, 2019

(65) Prior Publication Data

US 2020/0398642 A1 Dec. 24, 2020

(30) Foreign Application Priority Data

Jun. 21, 2019 (KR) .................. 10-2019-0074084

(51) Int. Cl.
*F25D 23/12* (2006.01)
*B60H 1/14* (2006.01)
*B60H 1/00* (2006.01)

(52) U.S. Cl.
CPC ......... *B60H 1/143* (2013.01); *B60H 1/00278* (2013.01); *B60H 1/00921* (2013.01); *B60H 2001/00307* (2013.01); *B60H 2001/00928* (2013.01)

(58) Field of Classification Search
CPC ................ B60H 1/143; B60H 1/00278; B60H 1/00921; B60H 2001/00307; B60H 2001/00928
USPC ...................................... 62/259.2
See application file for complete search history.

(56) References Cited

U.S. PATENT DOCUMENTS

| 8,215,432 B2 | 7/2012 | Nemesh et al. |
| 8,899,062 B2 | 12/2014 | Kadle et al. |
| 9,109,840 B2 | 8/2015 | Kadle et al. |
| 9,239,193 B2 | 1/2016 | Kadle et al. |

(Continued)

FOREIGN PATENT DOCUMENTS

| CN | 103380339 B | 1/2016 |
| DE | 10 2015 220 623 A1 | 4/2017 |

(Continued)

OTHER PUBLICATIONS

Extended European Search Report dated Apr. 15, 2020 for European Patent Application No. 19200726.8.

*Primary Examiner* — Davis D Hwu
(74) *Attorney, Agent, or Firm* — Morgan, Lewis & Bockius LLP

(57) ABSTRACT

A thermal management system for a vehicle may include: a cooling apparatus including a radiator, a first water pump, a first valve, and a reservoir tank connected through a coolant line; a battery cooling apparatus including a battery coolant line connected to the reservoir tank through a second valve, and a second water pump and a battery module connected through the battery coolant line; a chiller provided in a branch line connected to the battery coolant line through the second valve and connected to a refrigerant line of an air conditioner through a refrigerant connection line; and a heating circuit including a heater connected to the coolant line and the branch line through first and second connection lines.

15 Claims, 6 Drawing Sheets

(56) References Cited

U.S. PATENT DOCUMENTS

| | | | |
|---|---|---|---|
| 2013/0283838 A1 | 10/2013 | Kadle et al. | |
| 2016/0332505 A1* | 11/2016 | Yamanaka | B60H 1/00428 |
| 2016/0339761 A1* | 11/2016 | Enomoto | B60H 1/00278 |
| 2017/0021698 A1* | 1/2017 | Hatakeyama | B60H 1/143 |
| 2018/0117990 A1 | 5/2018 | Kim et al. | |
| 2018/0236842 A1 | 8/2018 | Allgaeuer et al. | |
| 2019/0061470 A1 | 2/2019 | Koberstein et al. | |
| 2020/0101816 A1* | 4/2020 | Takagi | B60H 1/00885 |
| 2020/0122545 A1* | 4/2020 | Lee | B60H 3/02 |

FOREIGN PATENT DOCUMENTS

| | | |
|---|---|---|
| JP | 5336033 B2 | 11/2013 |
| WO | WO 2013/023631 A1 | 2/2013 |
| WO | WO 2015/122137 A1 | 8/2015 |

* cited by examiner

THERMAL MANAGEMENT SYSTEM FOR VEHICLE

CROSS-REFERENCE TO RELATED APPLICATION

The present application claims priority to Korean Patent Application No. 10-2019-0074084 filed on Jun. 21, 2019, the entire contents of which is incorporated herein for all purposes by this reference.

BACKGROUND OF THE INVENTION

Field of the Invention

The present invention relates to a vehicle thermal management system, and more particularly, to a vehicle thermal management system which adjusts a temperature of a battery module by use of one chiller that performs heat exchange between a refrigerant and a coolant and improves heating efficiency by use of waste heat generated from an electrical component.

Description of Related Art

In recent years, an electric vehicle has become popular as a future transporting means, as environment and energy resources are becoming important issues. The electric vehicle utilizes a battery module in which a plurality of rechargeable cells is formed as one pack as a main power source, and thus no exhaust gas is generated and noise is very low.

Such an electric vehicle is driven by a drive motor which operates through electric power supplied from the battery module. Furthermore, the electric vehicle includes electrical components for controlling and managing the drive motor as well as a plurality of electronic convenience devices and charging the battery module.

On the other hand, since a large amount of heat is generated in the battery and the electrical components as well as the drive motor used as a primary power source of the electric vehicle, efficient cooling is required, so efficient temperature management of the electrical components and the battery module may be a very important problem.

Conventionally, separate cooling systems are applied to adjust the temperature of the electrical components and the battery module, but it is necessary to increase capacity of the cooling system according thereto, which leads to space restrictions. Furthermore, when the capacity of the cooling systems is increased, power required for operating the cooling systems is also increased.

Accordingly, it is required to develop technologies for efficiently using the waste heat generated from the electrical components, as well as adjusting the temperature of the electrical components and the battery to maximize the energy efficiency while securing the durability of the electrical components and the battery module in the electric vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle thermal management system, which adjusts a temperature of a battery module by use of one chiller that performs heat exchange between a refrigerant and a coolant and improves heating efficiency by use of waste heat generated from an electrical component.

Various aspects of the present invention are directed to providing a vehicle thermal management system, including: a cooling apparatus configured to include a radiator, a first water pump, a first valve, and a reservoir tank which are connected through a coolant line, and to circulate a coolant in the coolant line to cool at least one electrical component provided in the coolant line; a battery cooling apparatus configured to include a battery coolant line connected to the reservoir tank through a second valve, and a second water pump and a battery module which are connected through the battery coolant line to circulate the coolant in the battery module; a chiller provided in a branch line which is connected to the battery coolant line through the second valve and connected to a refrigerant line of an air conditioner through a refrigerant connection line, to adjust a temperature of the coolant by performing heat exchange between a coolant which is selectively supplied to the branch line and a refrigerant which is selectively supplied from the air conditioner; and a heating circuit configured to include a heater which is connected to the coolant line and the branch line through first and second connection lines to receive a coolant having a temperature which is increased while passing through the electrical component.

A first end portion of the first connection line may be connected to the coolant line through the first valve and a second end portion of the first connection line may be connected to the heater, a first end portion of the second connection line may be connected to the branch line between the second valve and the chiller and a second end portion of the second connection line may be connected to the heater, and the heater may be provided inside an HVAC module of the air conditioner.

The battery cooling apparatus may further include a coolant heater provided in the battery coolant line between the battery module and the second valve.

When the battery module is heated, the branch line may be opened through operation of the second valve, a portion of the battery coolant line connected to the reservoir tank may be closed based on the branch line, a coolant may circulate along the battery coolant line and the branch line through operation of the second water pump, and the coolant heater may be operated to heat a coolant supplied to the battery module along the battery coolant line and the branch line.

The air conditioner includes: an HVAC module configured to include an evaporator which is connected to the refrigerant line and an door configured to control outside air passing through the evaporator to be selectively introduced into the heater depending on cooling, heating, and heating/dehumidifying modes of the vehicle therein; a condenser connected to the refrigerant line and to the coolant line to perform heat exchange between the coolant and a refrigerant supplied through the refrigerant line; a compressor connected between the evaporator and the condenser through the refrigerant line; a sub-condenser provided in the refrigerant line between the condenser and the evaporator; a first expansion valve provided in the refrigerant line between the sub-condenser and the evaporator; and a second expansion valve provided in the refrigerant connection line.

A first end portion of the refrigerant connection line may be connected to the refrigerant line between the sub-condenser and the first expansion valve, and a second end portion of the refrigerant connection line may be connected to the refrigerant line between the evaporator and the compressor.

Each of the chiller and the condenser may be a water-cooled heat exchanger, and the sub-condenser may be an air-cooled heat exchanger.

The HVAC module may further include an air heater provided at an opposite side of the evaporator, with the heater disposed between the air heater and the evaporator to selectively heat outside air passing through the heater.

The air heater may be operated to raise a temperature of the outside air passing through the heater when a temperature of a coolant supplied to the heater is lower than a target temperature for heating the interior of the vehicle.

When the battery module is cooled in the cooling mode of the vehicle, a coolant may circulate through the coolant line by operation of the first water pump in the cooling; the first connection line may be closed through operation of the first valve to close the second connection line; the branch line may be opened through operation of the second valve, and a coolant may circulate along the battery coolant line and the branch line through operation of the second water pump in a state where a portion of the battery coolant line connected to the reservoir tank is closed with respect to the branch line in the battery cooling apparatus; the refrigerant line connecting the sub-condenser and the evaporator may be opened through operation of the first expansion valve in the air conditioner; the refrigerant connection line may be opened through operation of the second expansion valve; and the second expansion valve may expand a refrigerant supplied to the refrigerant connection line and supply the expanded refrigerant to the chiller.

When the electrical component and the battery module are cooled, the first and second connection lines and the branch line may be closed through operation of the first and second valves, the coolant, which is cooled in the radiator and stored in the reservoir tank, may be supplied to the electrical component through operation of the first water pump, and the coolant stored in the reservoir tank may be circulated in the battery coolant line connected to the reservoir tank through operation of the second valve to be supplied to the battery module.

When waste heat of the electrical component is recovered in a heating mode of the vehicle, the first connection line may be opened, and the second connection line may be opened through operation of the first valve, a portion of the coolant line connected to the radiator and a portion of the coolant line connecting the radiator and the reservoir tank may be closed based on the first connection line in the cooling apparatus, the branch line may be opened through operation of the second valve to close the battery coolant line other than a portion of the battery coolant line connected to the reservoir tank with respect to the branch line, some of the coolant having a temperature that has risen through the electrical component by operation of the first water pump may be supplied to the heater along the first connection line without passing through the radiator, and the coolant exhausted from the heater may be introduced into the branch line along the second connection line, and then may be introduced into the reservoir tank through a portion of the battery coolant line which is opened to connect the branch line and the reservoir tank.

The first valve may open the coolant line connected to the radiator to allow some of the coolant passing through the electrical component to flow into the first connection line and the remaining coolant to flow into the radiator when the electrical component is overheated.

Each of the first and second valves may be a three-way valve configured for distributing a flow.

The electrical component may include an electric power control unit (EPCU), a motor, an inverter, or an on board charger (OBC).

A described above, according to the vehicle thermal management system according to the exemplary embodiment of the present invention, the temperature of the battery module may be adjusted depending on the mode of the vehicle by use of one chiller for performing heat exchange between the coolant and the refrigerant, and the interior of the vehicle may be heated by use of the coolant, simplifying the entire system.

According to an exemplary embodiment of the present invention, it is also possible to improve the heating efficiency by recovering waste heat from the electrical component and using it for heating the interior of the vehicle.

Furthermore, according to an exemplary embodiment of the present invention, it is possible to optimize the performance of the battery module by efficiently controlling the temperature of the battery module, and increase an overall travel distance of the vehicle through efficient management of the battery module.

Furthermore, the entire system may be simplified to reduce manufacturing cost and weight, and to improve space utilization.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
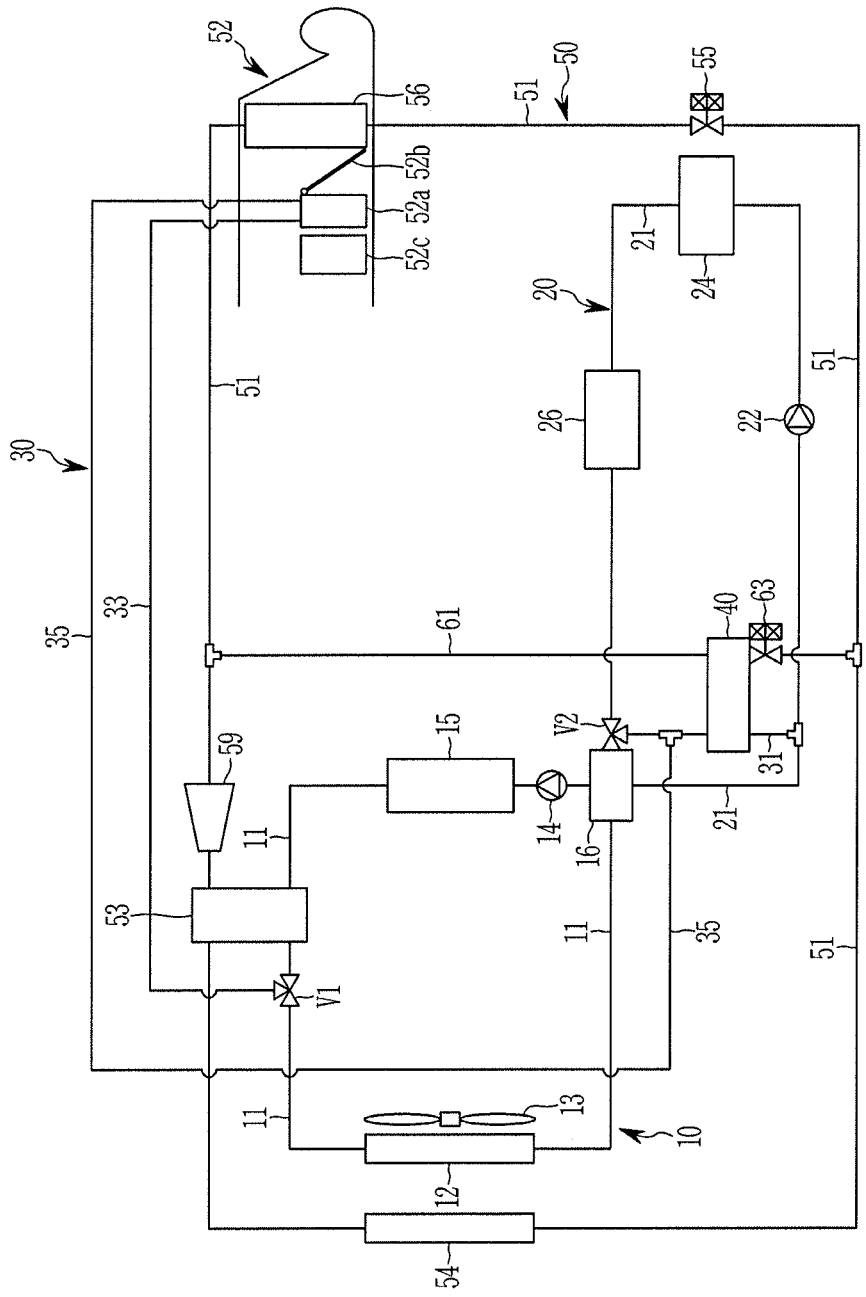
FIG. 1 illustrates a block diagram of a vehicle thermal management system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Since the exemplary embodiment described in the specification and the configurations shown in the drawings are merely the most preferable exemplary embodiment and configurations of the present invention, they do not represent all of the technical ideas of the present invention, and it may be understood that various equivalents and modified examples, which may replace the exemplary embodiments of the present invention, are possible when filing the present application.

To clearly describe the present invention, parts that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and to clearly illustrate several parts and areas, enlarged thicknesses are shown.

In addition, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

FIG. 1 illustrates a block diagram of a vehicle thermal management system according to an exemplary embodiment of the present invention.

According to the exemplary embodiment of the present invention, the vehicle thermal management system may adjust a temperature of a battery module 24 by use of one chiller 40 for performing heat exchange between a refrigerant and a coolant, and may recover waste heat generated from an electrical component 15 to use it for heating the interior of the vehicle.

Such a thermal management system may be applied to electric vehicles.

Referring to FIG. 1, the thermal management system may include a cooling apparatus 10, a battery cooling apparatus 20, a heating circuit 30, and the chiller 40.

First, the cooling apparatus 10 includes a radiator 12 connected to a coolant line 11, a first water pump 14, a first valve V1, and a reservoir tank 16.

The radiator 12 is mounted in the front of the vehicle, and a cooling fan 13 is mounted behind the radiator 12, so that the coolant is cooled through operation of the cooling fan 13 and heat exchange with the outside air.

Furthermore, the electrical component 15 may include an electric power control unit (EPCU), a motor, an inverter, or an on board charger (OBC).

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, the motor, the inverter, or the OBC may be recovered.

This cooling apparatus 10 may circulate the coolant in the coolant line 11 such that the coolant is supplied to the electrical component 15 provided in the coolant line 11.

The battery cooling apparatus 20 includes a battery coolant line 21 connected to the reservoir tank 16 through a second valve V2 and a second water pump 22 connected to the battery coolant line 21, and the battery module 24.

The battery cooling apparatus 20 may selectively circulate the coolant in the battery module 24 through operation of the second water pump 22.

Herein, the first water pump 14 and the second water pump 22 may each be an electric water pump.

Meanwhile, the battery cooling apparatus 20 may further include a coolant heater 26 provided in the battery coolant line 21 between the battery module 24 and the second valve V2.

When the temperature of the coolant supplied to the battery module 24 is lower than a target temperature, the coolant heater 26 may be activated to heat the coolant circulated in the battery coolant line 21. Accordingly, the coolant having an increased temperature while passing through the coolant heater 26 may be supplied to the battery module 24, to raise the temperature of the battery module 24.

That is, the coolant heater 26 may selectively operate when the temperature of the battery module 24 is raised.

In the exemplary embodiment of the present invention, the chiller 40 is provided in a branch line 31 connected to the battery coolant line 21 through the second valve V2.

The chiller 40 is connected to a refrigerant line 51 of an air conditioner 50 through a refrigerant connection line 61. That is, the chiller 40 may be a water-cooled heat exchanger into which a coolant flows.

Accordingly, the chiller 40 may regulate the temperature of the coolant by performing heat exchange between the coolant which is selectively supplied to the branch line 31 and the refrigerant which is selectively supplied from the air conditioner 50.

The heating circuit 30 includes a heater 52a which is connected to the coolant line 11 and the branch line 31 through first and second connection lines 33 and 35 to supply the coolant having the temperature which is increased while it passes through the electrical component 15 thereto.

Herein, a first end portion of the first connection line 33 may be connected to the coolant line 11 through the first valve V1, and a second end portion of the first connection line 33 may be connected to the heater 52a.

A first end portion of the second connection line 35 may connected to the branch line 31 between the second valve V2 and the chiller 40, and a second end portion of the second connection line 35 may be connected to the heater 52a.

Furthermore, the heater 52a may be provided inside a heating, ventilation, and air conditioning (HVAC) module 52 included in the air conditioner 50.

Accordingly, when an interior of the vehicle is heated, the heating circuit 30 may supply the high temperature coolant to the heater 52a through the branch line 31, the first connection line 33, and the second connection line 35 which are opened by operating the first and second valves V1 and V2.

In the exemplary embodiment of the present invention, the air conditioner 50 includes the HVAC module 52, a condenser 53, a sub-condenser 54, a first expansion valve 55, an evaporator 56, and a compressor 59 which are connected through the refrigerant line 51.

First, the HVAC module 52 includes the evaporator 56 connected therewith through the refrigerant line 51, and an door 52b for controlling the outside air passing through the evaporator 56 to be selectively introduced into the heater 52a depending on cooling, heating, and heating/dehumidifying modes of the vehicle therein.

That is, the door 52b is opened to allow the outside air passing through the evaporator 56 to be introduced into the heater 52a in the heating mode of the vehicle. In contrast, in the cooling mode of the vehicle, the door 52b closes off the heater 52a such that the outside air which is cooled while passing through the evaporator 56 directly flows into the vehicle.

The HVAC module 52 may further include an air heater 52c provided at an opposite side of the evaporator 56 with the heater 52a interposed therebetween to selectively heat the outside air passing through the heater 52a.

The air heater 52c may be operated to raise the temperature of the outside air passing through the heater 52a when the temperature of the coolant supplied to the heater 52a is lower than a target temperature for heating the interior of the vehicle.

In the exemplary embodiment of the present invention, the condenser 53 is connected to the refrigerant line 51 to allow the refrigerant to pass therethrough, and is connected to the coolant line 11 to allow the coolant circulating in the cooling apparatus 10 to pass therethrough.

This condenser 53 may condense the refrigerant through heat exchange with the coolant supplied through the coolant line 11. That is, the condenser 53 may be a water-cooled heat exchanger into which a coolant flows.

The condenser 53 configured as described above may perform heat exchange between the refrigerant supplied from the compressor 59 and the coolant supplied from the cooling apparatus 10 to condense the refrigerant.

In the exemplary embodiment of the present invention, the sub-condenser 54 may be provided in the refrigerant line 51 between the condenser 53 and the evaporator 56.

Herein, the sub-condenser 54 may further condense the refrigerant condensed in the condenser 53 through heat exchange with the outside air. In other words, the sub-condenser 54 is disposed in front of the radiator 12 to heat exchange the refrigerant introduced into the sub-condenser 54 and the outside air.

As a result, the sub-condenser 54 may be an air-cooled heat exchanger for condensing the refrigerant by use of outside air.

Accordingly, the sub-condenser 54 may further condense the refrigerant which is condensed in the condenser 53 to increase subcooling of the coolant, improving a coefficient of performance (COP), which is a coefficient of the cooling capacity relative to the power required by the compressor.

The first expansion valve 55 is provided in the refrigerant line 51 between the sub-condenser 54 and the evaporator 56. The first expansion valve 55 receives the refrigerant passing through the second condenser 54 to expand it.

In the exemplary embodiment of the present invention, a first end portion of the refrigerant connection line 61 is connected to the refrigerant line 51 between the sub-condenser 54 and the first expansion valve 55. A second end portion of the refrigerant connection line 61 may be connected to the refrigerant line 51 between the evaporator 56 and the compressor 59.

Herein, a second expansion valve 63 is provided in the refrigerant connection line 61. The second expansion valve 63 may expand the refrigerant flowing through the refrigerant connection line 61 to introduce it into the chiller 40 when the battery module 24 is cooled by the refrigerant.

Herein, the second expansion valve 63 is operated to expand the refrigerant when the battery module 24 is cooled by use of the refrigerant in the cooling mode of the vehicle.

This second expansion valve 63 may introduce the refrigerant exhausted from the sub-condenser 54 into the chiller 40 in a state where the temperature of the refrigerant is reduced by expanding the refrigerant, to further reduce the temperature of the coolant passing through the interior of the chiller 40.

As a result, the coolant having the temperature which is reduced while passing through the chiller 40 is introduced into the battery module 24, being more efficiently cooled.

The compressor 59 is connected thereto between the evaporator 56 and the condenser 53 through the refrigerant line 51. This compressor 59 may compress the gaseous refrigerant and supply the compressed refrigerant to the condenser 53.

Herein, the first and second expansion valves 55 and 63 may be electronic expansion valves that selectively expand the coolant while controlling a flow of the refrigerant through the coolant line 51 or the refrigerant connection line 61.

Alternatively, each of the first and second valves V1 and V2 may be a three-way valve configured for distributing the flow.

Hereinafter, operation and function of the vehicle thermal management system according to the exemplary embodiment of the present invention configured as described above will be described in detail with reference to FIG. 2 to FIG. 6.

First, operation of a case of cooling the electrical component 15 and the battery module 24 using the radiator 12 in the vehicle thermal management system according to the exemplary embodiment of the present invention will be described with reference to FIG. 2.

Figure 2:
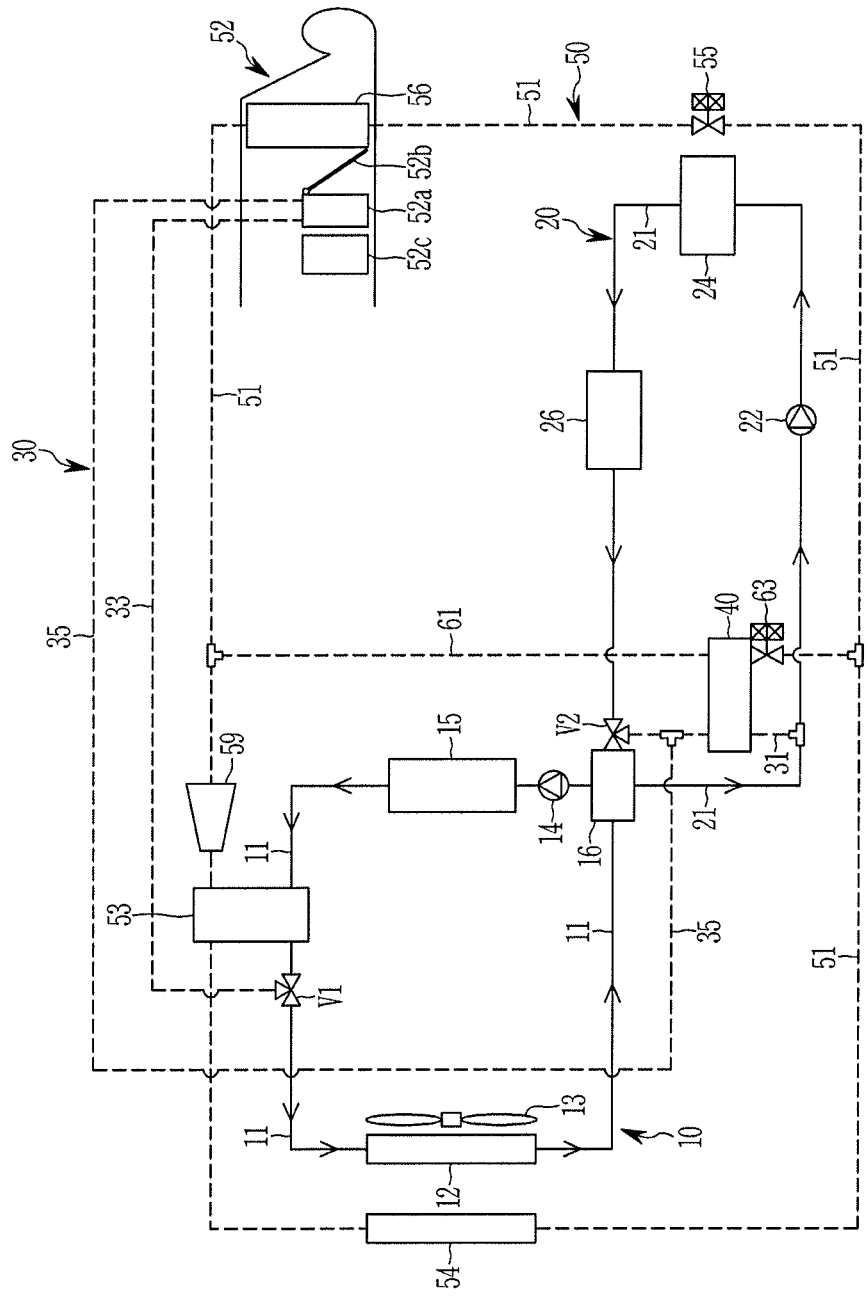
FIG. 2 illustrates an operational state diagram for cooling electrical components and a battery module by use of a radiator in a vehicle thermal management system according to an exemplary embodiment of the present invention.

FIG. 2 illustrates an operational state diagram for cooling electrical components and a battery module by use of a radiator in a vehicle thermal management system according to an exemplary embodiment of the present invention.

Referring to FIG. 2, the branch line 31 and the first and second connection lines 33 and 35 are closed through operations of the first and second valves V1 and V2.

Furthermore, the battery coolant line 21 is connected to the reservoir tank 16 through operation of the second valve V2.

In the present state, in the cooling apparatus 10, the first water pump 14 is operated to cool the electrical component 15. Accordingly, the coolant which is cooled in the radiator 12 and stored in the reservoir tank 16 is supplied to the electrical component 15.

In the present state, in the battery cooling apparatus 20, the second water pump 22 is operated to cool the battery module 24.

Accordingly, the coolant stored in the reservoir tank 16 is supplied to the battery module 24, while circulating through the battery coolant line 21 connected to the reservoir tank 16 by operation of the second valve V2.

That is, the coolant cooled in the radiator 12 and stored in the reservoir tank 16 circulates through the coolant line 11 and the battery coolant line 21 by the operations of the first and second water pumps 14 and 22, respectively, to efficiently cool the electrical component 15 and the battery module 24.

The air conditioner 50 is not operated because the cooling mode of the vehicle is not activated.

On the other hand, although it has been described in the exemplary embodiment of the present invention that both of the electrical component 15 and the battery module 24 are cooled, the present invention is not limited thereto, and when one of the electrical component 15 and the battery module 24 is separately cooled, the first and second water pumps 14 and 22 may be selectively operated.

Operation of the case of cooling the battery module 24 in the cooling mode of the vehicle will be described with respect to FIG. 3.

Figure 3:
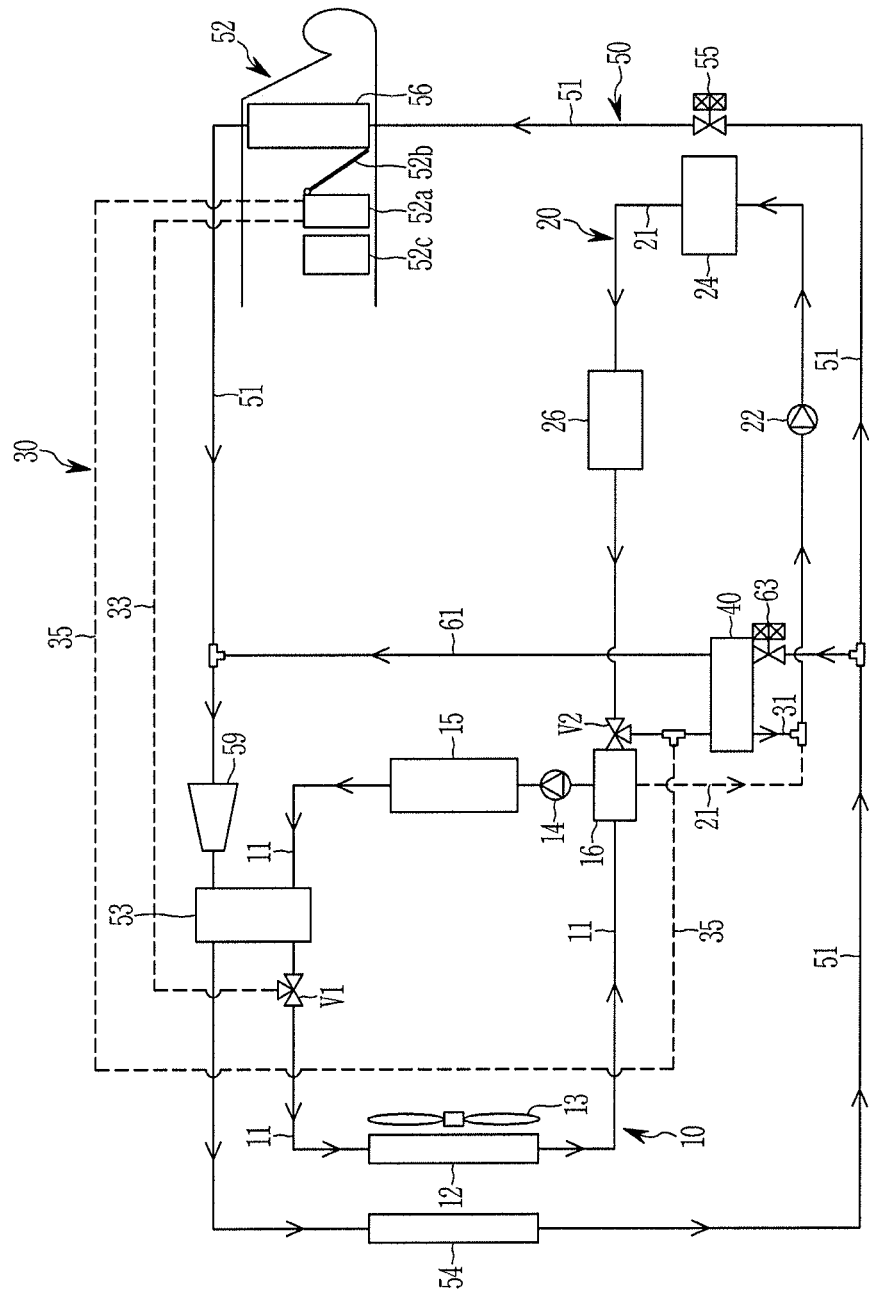
FIG. 3 illustrates an operational state diagram for cooling a battery module by use of a refrigerant in a cooling mode of a vehicle in a vehicle thermal management system according to an exemplary embodiment of the present invention.

FIG. 3 illustrates an operational state diagram for cooling a battery module by use of a e rant in a cooling mode of a vehicle in a vehicle thermal management system according to an exemplary embodiment of the present invention.

Referring to FIG. 3, in the cooling apparatus 10, the coolant is circulated in the coolant line 11 through operation of the first water pump 14.

Herein, the first connection line 33 is closed through operation of the first valve V1 to close the second connection line 35.

Accordingly, the coolant cooled in the radiator 12 may be supplied to the condenser 53 through operation of the first water pump 14.

In the battery cooling apparatus 20, the branch line 31 is opened through operation of the second valve V2. A portion of the battery coolant line 21 connected to the reservoir tank 16 is closed on the basis of the branch line 31.

In the present state, the coolant having passed through the chiller 40 may be supplied to the battery module 24 while it circulates along the branch line 31 and the battery coolant line 21 connected to the branch line 31 without passing through the reservoir tank 16 through operation of the second water pump 22.

That is, in the battery cooling apparatus 20, a closed circuit through which the coolant independently circulates may be formed by connecting the opened branch line 31 with the battery coolant line 21 in a state where the connection with the connection of the reservoir tank 16 is closed through operation of the second valve V2.

In the air conditioner 50, each constituent element operates to cool the interior of the vehicle. Accordingly, the refrigerant is circulated along the refrigerant line 51.

Herein, the refrigerant line 51 connecting the sub-condenser 54 and the evaporator 56 is opened through operation of the first expansion valve 55. The refrigerant connection line 61 is opened through operation of the second expansion valve 63.

Accordingly, the refrigerant having passed through the sub-condenser 54 may be circulated along the refrigerant line 51 and the refrigerant connection line 61.

Herein, the first and second expansion valves 55 and 63 may expand the refrigerant such that the expanded refrigerant is supplied to the evaporator 56 and the chiller 40, respectively.

The condenser 53 condenses the refrigerant by use of the coolant flowing along the coolant line 11. The sub-condenser 54 may further condense the refrigerant introduced from the condenser 53 through heat exchange with the outside air.

The coolant passing through the chiller 40 is circulated in the battery coolant line 21 and the first branch line 31 without passing through the reservoir tank 16 to cool the battery module through operation of the second water pump 22.

The coolant passing through the chiller 40 is cooled through heat exchange with the expanded refrigerant which is supplied to the chiller 40. The coolant cooled in the chiller 40 is supplied to the battery module 24. Accordingly, the battery module 24 is cooled by the cooled coolant.

That is, the second expansion valve 63 expands some of the coolant through the sub-condenser 54 to supply the expanded coolant to the chiller 40, and opens the refrigerant connection line 61.

Accordingly, the refrigerant discharged from the sub-condenser 54 is expanded to enter a low-temperature and low-pressure state through operation of the integrated control valve 63, and flows into the first chiller 40 connected to the first connection line 61.

Thereafter, the refrigerant flowing into the first chiller 40 performs heat exchange with the coolant and flows into the compressor 59 through the first connection line 61.

The coolant having the temperature which is raised while cooling the battery module 24 is cooled through the heat-exchange with the low-temperature and low-pressure refrigerant inside the chiller 40. The cooled coolant is again supplied to the battery module 24 through the battery coolant line 21 and the branch line 31.

As a result, the coolant may efficiently cool the battery module 24 while repeating the above operation.

On the other hand, the remaining refrigerant discharged from the sub-condenser 54 flows through the refrigerant line 51 to cool the interior of the vehicle, and sequentially passes through the first expansion valve 55, the evaporator 56, the compressor 59, and the condenser 53.

Herein, the outside air flowing into the HVAC module 52 is cooled while passing through the evaporator 56 by the low-temperature refrigerant flowing into the evaporator 56.

In the instant case, a portion of the heater 52a through which the cooled outside air passes is closed by the door 52b such that the outside air does not pass through the heater 52a. Accordingly, the cooled outside air directly flows into the interior of the vehicle, cooling the vehicle interior.

On the other hand, the coolant having an amount of condensation which is increased while sequentially passing through the condenser 53 and the sub-condenser 54 may be expanded and supplied to the evaporator 56, allowing the refrigerant to be evaporated to a lower temperature.

As a result, in the exemplary embodiment of the present invention, the condenser 53 condenses the refrigerant, and the sub-condenser 54 further condenses the refrigerant, which is advantageous in forming the sub-cooling of the refrigerant.

Furthermore, the sub-cooled refrigerant may be evaporated to a lower temperature in the evaporator 56, improving cooling performance and efficiency.

The refrigerant may cool the interior of the vehicle in the cooling mode of the vehicle while repeating the above-described processes, and at the same time, may cool the coolant through the heat exchange while passing through the chiller 40.

The low-temperature coolant cooled in the chiller 40 is introduced into the battery module 24. Accordingly, the battery module 24 may be efficiently cooled by the low-temperature coolant supplied therefrom.

In the exemplary embodiment of the present invention, operation of the case of recovering the waste heat of the electrical component 15 in the heating mode of the vehicle will be described with reference to FIG. 4.

Figure 4:
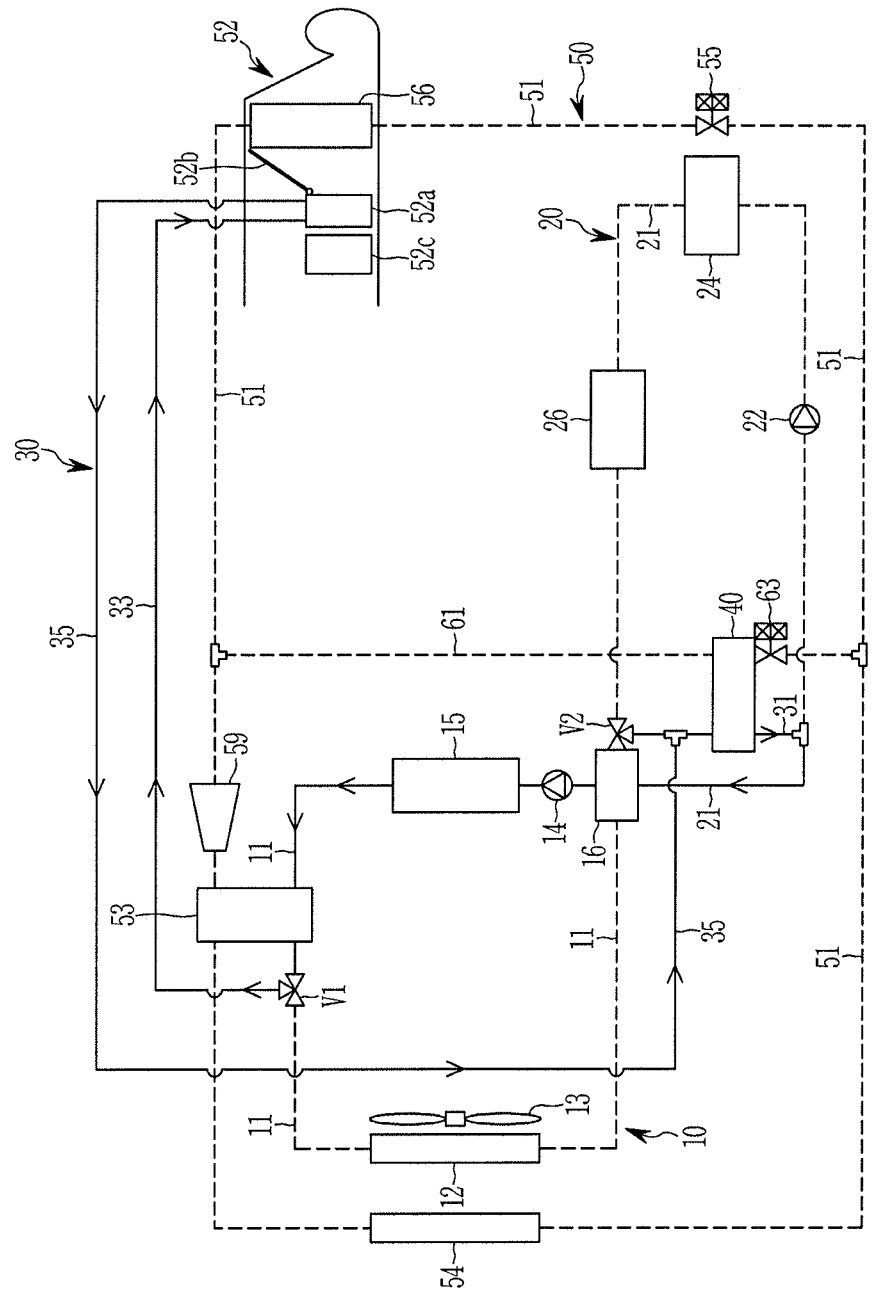
FIG. 4 illustrates an operational state diagram for recovering waste heat of electrical components in a heating mode of a vehicle in a vehicle thermal management system according to an exemplary embodiment of the present invention.

FIG. 4 illustrates an operational state diagram for recovering waste heat of electrical components in a heating mode of a vehicle in a vehicle thermal management system according to an exemplary embodiment of the present invention.

Referring to FIG. 4, the heat management system may recover the waste heat of the electric component 15 and use it for heating the interior of the vehicle.

First, in the cooling apparatus 10, the first water pump 14 is operated for circulation of the coolant. In the instant case, the air conditioner 50 is stopped.

Herein, the first connection line 33 is opened through operation of the first valve V1. At the same time, the second connection line 35 is opened.

Furthermore, on the basis of the first connection line 33, a portion of the coolant line 11 connected to the radiator 12 and a portion of the coolant line 11 connecting the radiator 12 and the reservoir tank 16 are closed through operation of the first valve V1.

The branch line 31 is opened through operation of the second valve V1 to close the battery coolant line 21 other than a portion of the battery coolant line 21 connected to the reservoir tank 16 with respect to the branch line 31.

That is, the battery coolant line 21 connecting the second water pump 22, the battery module 24, and the coolant heater 26 is closed, and the battery cooling apparatus 20 is deactivated.

In the present state, the coolant having the temperature that has risen through the electrical component 15 by operation of the first water pump 14 is supplied to the heater 52a along the first connection line 33 without passing through the radiator 12.

The coolant exhausted from the heater 52a is introduced into the branch line 31 along the second connection line 35, and then is introduced into the reservoir tank 16 through a portion of the battery coolant line 21 which is opened to connect the branch line 31 and the reservoir tank 16.

That is, the coolant that has passed through the electrical component 15 continues to circulate along the coolant line, the first and second connection lines 33 and 35, the branch line 31, and a portion of the battery coolant line 21 without passing through the radiator 12, and absorbs the waste heat from the electric component 15, such that the temperature thereof increases.

The coolant having the temperature that has been raised is supplied to the heater 52a through the opened first connection line 33 without passing through the radiator 12.

The high-temperature coolant supplied to the heater 52a performs heat exchange with the outside air, and then is introduced into the coolant line 11 through the second connection line 35, and the branch line 31 and a portion of the battery coolant line 21 without passing through the radiator 12.

Herein, the door 52b is opened such that the outside air flowing into the HVAC module 52 passes through the heater 52a.

Accordingly, the outside air introduced from the outside thereof flows into a room temperature state in which it is not cooled when passing through the evaporator 56 to which no refrigerant is supplied. The introduced outside air may be converted into a high temperature state while passing through the heater 52a, and flows into the vehicle, heating the interior of the vehicle.

Meanwhile, the air heater 52c may be selectively operated depending on the temperature of the outside air passing through the heater 52a. The air heater 52c may be operated when the temperature of the outside air passing through the heater 52a is lower than a target temperature, heating the outside air flowing into the vehicle interior.

The air heater 52c is operated when the temperature of the outside air that has completed heat exchange with the high-temperature coolant while passing through the heater 52a is lower than a predetermined temperature or a target heating temperature. As a result, when the air heater 52c is operated, the outside air may be heated while passing through the air heater 52c, to be introduced into the vehicle interior in a state where the temperature is raised.

In other words, according to an exemplary embodiment of the present invention, it is possible to recover the waste heat generated in the electrical component 15 while repeating the above-described process, and use the waste heat for heating the interior of the vehicle, reducing power consumption and improving overall heating efficiency.

In the exemplary embodiment of the present invention, operation of the case of recovering and cooling the waste heat of the electrical component 15 in the heating mode of the vehicle will be described with reference to FIG. 5.

Figure 5:
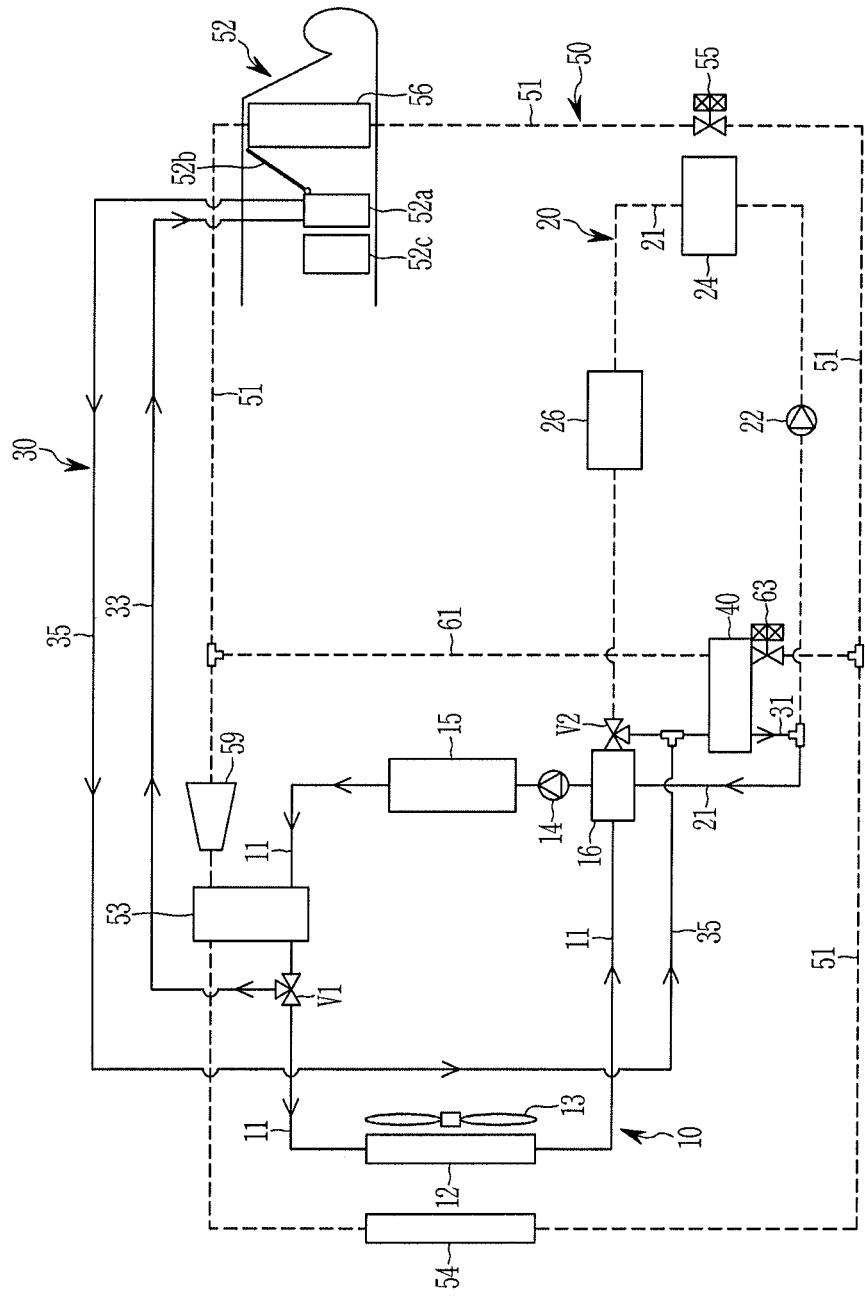
FIG. 5 illustrates an operational state diagram for recovering and cooling waste heat of electrical components in a heating mode of a vehicle in a vehicle thermal management system according to an exemplary embodiment of the present invention.

FIG. 5 illustrates an operational state diagram for recovering and cooling waste heat of electrical components in a heating mode of a vehicle in a vehicle thermal management system according to an exemplary embodiment of the present invention.

Referring to FIG. 5, in the cooling apparatus 10, the first water pump 14 is operated for circulation of the coolant. In the instant case, the air conditioner 50 is stopped.

Herein, the first connection line 33 is opened, and the second connection line 35 is opened through operation of the first valve V1. Simultaneously, the first valve V1 opens a portion of the coolant line 11 connected to the radiator 12 based on the first connection line 33.

The branch line 31 is opened through operation of the second valve V1 to close the battery coolant line 21 other than a portion of the battery coolant line 21 connected to the reservoir tank 16 with respect to the branch line 31.

That is, the battery coolant line 21 connecting the second water pump 22, the battery module 24, and the coolant heater 26 is closed, and the battery cooling apparatus 20 is deactivated.

In the present state, some of the coolant having the temperature that has risen through the electrical component 15 by operation of the first water pump 14 is supplied to the heater 52a along the first connection line 33 without passing through the radiator 12.

The coolant exhausted from the heater 52a is introduced into the branch line 31 along the second connection line 35, and then is introduced into the reservoir tank 16 through a portion of the battery coolant line 21 which is opened to connect the branch line 31 and the reservoir tank 16.

That is, some of the coolant that has passed through the electrical component 15 continues to circulate along the coolant line, the first and second connection lines 33 and 35, the branch line 31, and a portion of the battery coolant line 21 without passing through the radiator 12, and absorbs the waste heat from the electrical component 15, such that the temperature thereof increases.

Accordingly, some of the coolant having the temperature that has been raised is supplied to the heater 52a through the opened first connection line 33 without passing through the radiator 12.

The high-temperature coolant supplied to the heater 52a performs heat exchange with the outside air, and then is introduced into the coolant line 11 through the second connection line 35, and the branch line 31 and a portion of the battery coolant line 21, without passing through the radiator 12.

Herein, the door 52b is opened such that the outside air flowing into the HVAC module 52 passes through the heater 52a.

Accordingly, the outside air introduced from the outside thereof flows in a room temperature state in which it is not cooled when passing through the evaporator 56 to which no refrigerant is supplied. The introduced outside air may be converted into a high temperature state while passing through the heater 52a, and flows into the vehicle, heating the interior of the vehicle.

Meanwhile, the remaining coolant, which is not supplied to the heater 52a, is cooled through the radiator 12.

The coolant that has been completely cooled may recover waste heat while passing through the electrical component 15, and at the same time, may efficiently cool the electrical component 15, together with the coolant introduced into the reservoir tank 16 through the second connection line 35, the branch line 31, and a portion of the battery coolant line 21.

When the electrical component 15 is overheated, the first valve V1 may open the coolant line 11 connected to the radiator 12 to allow some of the coolant passing through the electrical component 15 to flow into the first connection line 33 and the remaining coolant to flow into the radiator 12.

As a result, some coolant cooled in the radiator 12 may be supplied to the electrical component 15, preventing the electrical component 15 from overheating.

Therefore, according to an exemplary embodiment of the present invention, it is possible to recover the waste heat generated in the electrical component 15, and use the waste heat for heating the interior of the vehicle, reducing power consumption and improving overall heating efficiency.

At the same time, according to an exemplary embodiment of the present invention, some coolant may be introduced into the radiator 12 through operation control of the first valve V1 configured for distributing the flow, to be cooled, and then be supplied to the electrical component 15, efficiently cooling the electrical component 15 and ensuring the cooling performance of the electrical component 15.

Operation of the case of heating the battery module 26 will be described with respect to FIG. 6.

Figure 6:
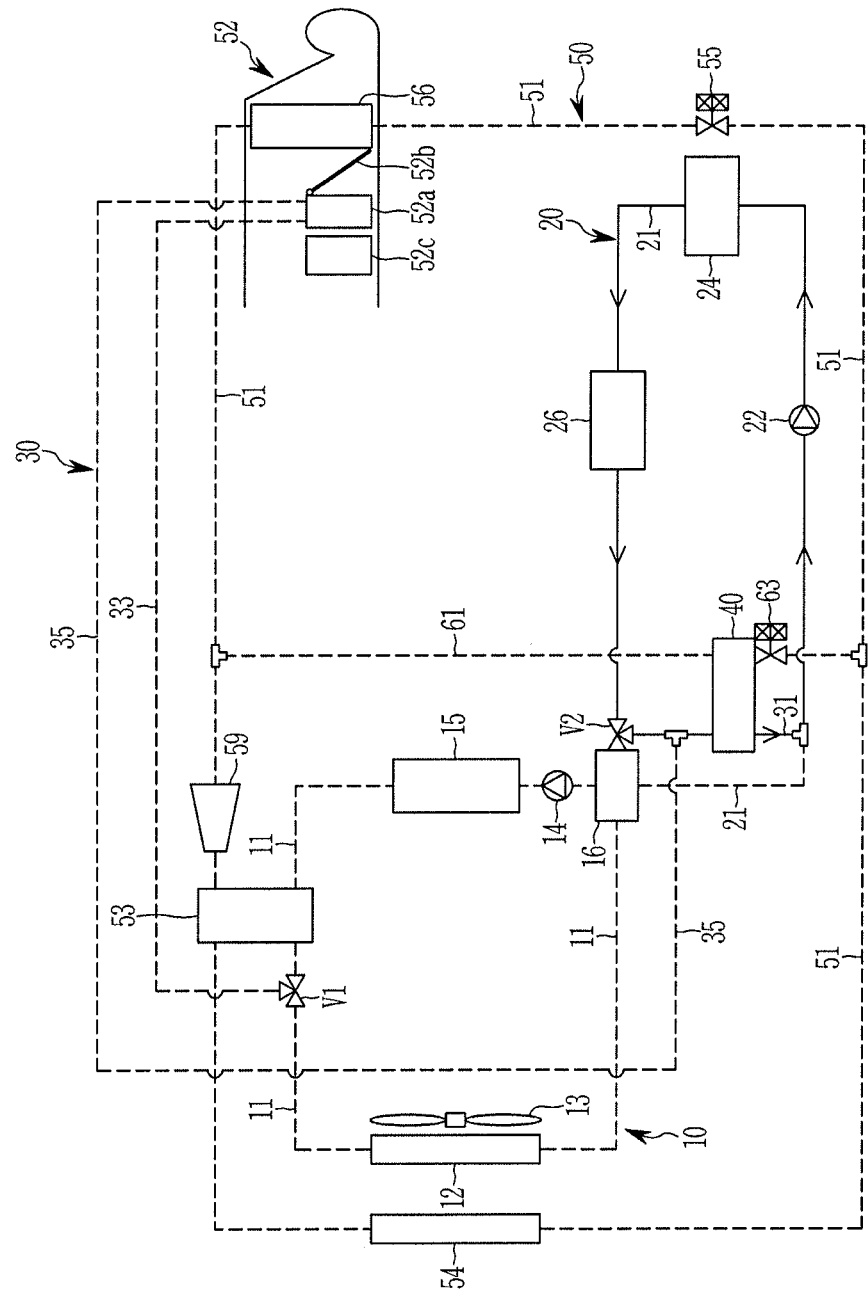
FIG. 6 illustrates a detailed perspective view for heating a battery module in a vehicle thermal management system according to an exemplary embodiment of the present invention.

FIG. 6 illustrates a detailed perspective view for heating a battery module in a vehicle thermal management system according to an exemplary embodiment of the present invention.

Referring to FIG. 6, the cooling apparatus 10, the heating circuit 30, and the air conditioner 40 are stopped.

Herein, the branch line 31 is opened through operation of the second valve V2 to close a portion of the battery coolant line 21 connected to the reservoir tank 16 with respect to the branch line 31.

That is, the battery coolant line 21 connecting the second water pump 22, the battery module 24, and the coolant heater 26 in the battery cooling apparatus 20 is opened to be connected to the branch line 31.

In the present state, the coolant is circulated along the battery coolant line 21 and the branch line 31 through operation of the second water pump 22.

Herein, the coolant heater 26 is operated to heat the coolant supplied to the battery module 24 along the open battery coolant line 21 and the branch line 31.

Accordingly, the coolant circulating in the battery coolant line 21 and the branch line 31 rises in temperature as it passes through the coolant heater 26. Accordingly, the coolant having an increased temperature while passing through the coolant heater 26 may be supplied to the battery module 24, to raise the temperature of the battery module 24.

As a result, according to an exemplary embodiment of the present invention, it is possible to rapidly increase the temperature of the battery module 24 while repeating the above-described process, efficiently managing the temperature of the battery module 24.

Therefore, a described above, according to the vehicle thermal management system according to the exemplary embodiment of the present invention, the temperature of the battery module 24 may be adjusted depending on the mode of the vehicle by use of one chiller 40 for performing heat exchange between the coolant and the refrigerant, and the interior of the vehicle may be heated by use of the coolant, simplifying the entire system.

According to an exemplary embodiment of the present invention, it is also possible to improve the heating efficiency by recovering waste heat from the electrical component 15 and using it for heating the interior of the vehicle.

Furthermore, according to an exemplary embodiment of the present invention, it is possible to optimize the performance of the battery module 24 by efficiently controlling the temperature of the battery module 24, and increase an overall travel distance of the vehicle through efficient management of the battery module 24.

In an exemplary embodiment of the present invention, a controller is connected to the thermal management system, for instance to the first and second valves V1 and V2 to control the thermal management system. The controller may be at least one microprocessor operated by a predetermined program which may include a series of commands control the heat pump system in accordance with various exemplary embodiments of the present invention.

Furthermore, the entire system may be simplified to reduce manufacturing cost and weight, and to improve space utilization.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A thermal management system for a vehicle, the thermal management system comprising:
   a cooling apparatus including a radiator, a first water pump, a first valve, and a reservoir tank which are connected through a coolant line, to circulate a coolant in the coolant line to cool at least one electrical component mounted in the coolant line;
   a battery cooling apparatus including a battery coolant line connected to the reservoir tank through a second valve, and a second water pump and a battery module which are connected through the battery coolant line to circulate the coolant in the battery module;
   a chiller mounted in a branch line which is connected to the battery coolant line through the second valve and connected to a refrigerant line of an air conditioner through a refrigerant connection line, to adjust a temperature of the coolant by performing heat exchange between a coolant which is selectively supplied to the branch line and a refrigerant which is selectively supplied from the air conditioner; and
   a heating circuit including a heater which is connected to the coolant line and the branch line through first and second connection lines to receive a coolant having a temperature which is increased while passing through the at least one electrical component,
   wherein a first end portion of the first connection line is connected to the coolant line through the first valve and a second end portion of the first connection line is connected to the heater,
   wherein a first end portion of the second connection line is connected to the branch line between the second valve and the chiller and a second end portion of the second connection line is connected to the heater, and
   wherein the heater is mounted inside a heating, ventilation, and air conditioning (HVAC) module of the air conditioner.

2. The thermal management system of claim 1,
   wherein the battery cooling apparatus further includes a coolant heater mounted in the battery coolant line between the battery module and the second valve.

3. The thermal management system of claim 2, wherein when the battery module is heated,
   the branch line is opened through operation of the second valve,
   a portion of the battery coolant line connected to the reservoir tank is closed based on the branch line,
   a coolant circulates along the battery coolant line and the branch line through operation of the second water pump, and
   the coolant heater is operated to heat a coolant supplied to the battery module along the battery coolant line and the branch line.

4. The thermal management system of claim 1, wherein the air conditioner includes:
   the HVAC module including an evaporator which is connected to the refrigerant line and an door configured to control outside air passing through the evaporator to be selectively introduced into the heater depending on cooling, heating, and heating/dehumidifying modes of the vehicle;
   a condenser connected to the refrigerant line and to the coolant line to perform heat exchange between the coolant and a refrigerant supplied through the refrigerant line;
   a compressor connected between the evaporator and the condenser through the refrigerant line;
   a sub-condenser mounted in the refrigerant line between the condenser and the evaporator;
   a first expansion valve mounted in the refrigerant line between the sub-condenser and the evaporator; and
   a second expansion valve mounted in the refrigerant connection line.

5. The thermal management system of claim 4,
   wherein a first end portion of the refrigerant connection line is connected to the refrigerant line between the sub-condenser and the first expansion valve, and
   wherein a second end portion of the refrigerant connection line is connected to the refrigerant line between the evaporator and the compressor.

6. The thermal management system of claim 5,
   wherein the second expansion valve is mounted in the refrigerant line between the chiller and the first end portion of the refrigerant connection line.

7. The thermal management system of claim 4,
   wherein each of the chiller and the condenser is a water-cooled heat exchanger, and the sub-condenser is an air-cooled heat exchanger.

8. The thermal management system of claim 4,
   wherein the HVAC module further includes an air heater mounted at a side of the evaporator, with the heater disposed between the air heater and the evaporator to selectively heat outside air passing through the heater.

9. The thermal management system of claim 8,
   wherein the air heater is operated to raise a temperature of the outside air passing through the heater when a temperature of a coolant supplied to the heater is lower than a predetermined target temperature for heating the interior of the vehicle.

10. The thermal management system of claim 4, wherein when the battery module is cooled in the cooling mode of the vehicle,
    a coolant circulates through the coolant line by operation of the first water pump in the cooling apparatus;
    the first connection line is closed through operation of the first valve to close the second connection line;
    the branch line is opened through operation of the second valve, and a coolant circulates along the battery coolant line and the branch line through operation of the second water pump in a state in which a portion of the battery coolant line connected to the reservoir tank is closed with respect to the branch line in the battery cooling apparatus;
    the refrigerant line connecting the sub-condenser and the evaporator is opened through operation of the first expansion valve in the air conditioner;
    the refrigerant connection line is opened through operation of the second expansion valve; and
    the second expansion valve expands a refrigerant supplied to the refrigerant connection line and supplies the expanded refrigerant to the chiller.

11. The thermal management system of claim 1, wherein when the at least one electrical component and the battery module are cooled,
    the first and second connection lines and the branch line are closed through operation of the first and second valves, the coolant, which is cooled in the radiator and stored in the reservoir tank, is supplied to the at least one electrical component through operation of the first water pump, and the coolant stored in the reservoir tank is circulated in the battery coolant line connected to the reservoir tank through operation of the second valve to be supplied to the battery module.

12. The thermal management system of claim 1, wherein when waste heat of the at least one electrical component is recovered in a heating mode of the vehicle, the first connection line is opened, and the second connection line is opened through operation of the first valve, a portion of the coolant line connected to the radiator is connected to the first connection line and a portion of the coolant line connecting the radiator to the reservoir tank are closed based on the first connection line in the cooling apparatus, the branch line is opened through operation of the second valve to close the battery coolant line except a portion of the battery coolant line connected to the reservoir tank with respect to the branch line, a part of the coolant having a temperature that has risen through the at least one electrical component by operation of the first water pump is supplied to the heater along the first connection line without passing through the radiator, and the coolant exhausted from the heater is introduced into the branch line along the second connection line, and then is introduced into the reservoir tank through a portion of the battery coolant line which is opened to connect the branch line and the reservoir tank.

13. The thermal management system of claim 12, wherein the first valve opens the coolant line connected to the radiator to allow a part of the coolant passing through the at least one electrical component to flow into the first connection line and a remaining coolant to flow into the radiator when the at least one electrical component is overheated.

14. The thermal management system of claim 1, wherein each of the first and second valves is a three-way valve.

15. The thermal management system of claim 1, wherein the at least one electrical component includes an electric power control unit (EPCU), a motor, an inverter, or an on board charger (OBC).

\* \* \* \* \*